US008923625B2

(12) United States Patent
Koyama

(10) Patent No.: US 8,923,625 B2
(45) Date of Patent: Dec. 30, 2014

(54) ORIGINAL IMAGE SEARCHING DEVICE, ORIGINAL IMAGE SEARCHING METHOD, AND COMPUTER READABLE MEDIUM

(75) Inventor: Toshiya Koyama, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1128 days.

(21) Appl. No.: 12/405,660

(22) Filed: Mar. 17, 2009

(65) Prior Publication Data

US 2010/0054610 A1  Mar. 4, 2010

(30) Foreign Application Priority Data

Sep. 4, 2008  (JP) ................................. 2008-227167

(51) Int. Cl.
*G06K 9/68* (2006.01)
*G06K 9/00* (2006.01)

(52) U.S. Cl.
CPC ........ *G06K 9/00483* (2013.01); *G06K 9/00449* (2013.01)
USPC .......................................... 382/218; 382/195

(58) Field of Classification Search
CPC ............................ G06F 17/30011; G06T 11/60
USPC .................. 382/305, 306, 195, 218; 715/255
See application file for complete search history.

(56) References Cited

U.S. PATENT DOCUMENTS

| 4,633,506 A * | 12/1986 | Kato ............................. 382/236 |
| 4,827,330 A * | 5/1989 | Walsh et al. ................... 358/452 |
| 6,446,099 B1 | 9/2002 | Peairs |
| 7,272,269 B2 * | 9/2007 | Tojo et al. ..................... 382/305 |
| 7,783,080 B2 * | 8/2010 | Itoh ............................... 382/112 |
| 8,176,054 B2 * | 5/2012 | Moraleda ....................... 707/743 |
| 2008/0152225 A1 * | 6/2008 | Iwamoto ........................ 382/190 |

FOREIGN PATENT DOCUMENTS

| JP | 2000-112995 A | 4/2000 |
| JP | 2003-091730 A | 3/2003 |
| JP | 2006-203429 A | 8/2006 |
| JP | 2008-123456 A | 5/2008 |

OTHER PUBLICATIONS

Translation of an Office Action issued Jul. 17, 2012 by the Japanese Patent Office in counterpart Japanese Application No. 2008-227167.

* cited by examiner

*Primary Examiner* — Matthew Bella
*Assistant Examiner* — Dennis Rosario
(74) *Attorney, Agent, or Firm* — Sughrue Mion, PLLC

(57) ABSTRACT

An original image searching device includes: an acquiring unit that acquires an image-after-changed to which a change is added, the image-after-changed having contents different from contents of an original image; and an original image specifying unit that specifies, as a checking region, a discriminating region including an image common to the original image and the image-after-changed, and that specifies the original image of the image-after-changed by comparing a checking region of each of the images stored in an image storage and a checking region of the image-after-changed.

10 Claims, 10 Drawing Sheets

ORIGINAL IMAGE SEARCHING DEVICE, ORIGINAL IMAGE SEARCHING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-227167 filed Sep. 4, 2008.

BACKGROUND

1. Technical Field

This invention relates to an original image searching device, an original image searching method, and a computer readable medium.

2. Related Art

A certain document (document-before-changed) is read by a scanner; the document thus read is electronifed as an original image and stored in a data base. When a document (document-after-changed) created with an addition of any change to the document-before-changed is acquired, in order to extract what change has been added to the document-before-changed, a difference extracting technique is employed. Specifically, the document-after-changed is read using the scanner to create an image-after-changed. The image-after-changed is compared with the original image to extract a difference. However, in order to swiftly search the original image from a large quantity of images stored, any contrivance is needed.

SUMMARY

According to an aspect of the present invention, an original image searching device includes: an acquiring unit that acquires an image-after-changed to which a change is added, the image-after-changed having contents different from contents of an original image; and an original image specifying unit that specifies, as a checking region, a discriminating region including an image common to the original image and the image-after-changed, and that specifies the original image of the image-after-changed by comparing a checking region of each of the images stored in an image storage and a checking region of the image-after-changed.

BRIEF DESCRIPTION OF THE DRAWINGS

Exemplary embodiment of the present invention will be described in detail based on the following figures, wherein.

DETAILED DESCRIPTION

Figure 1:
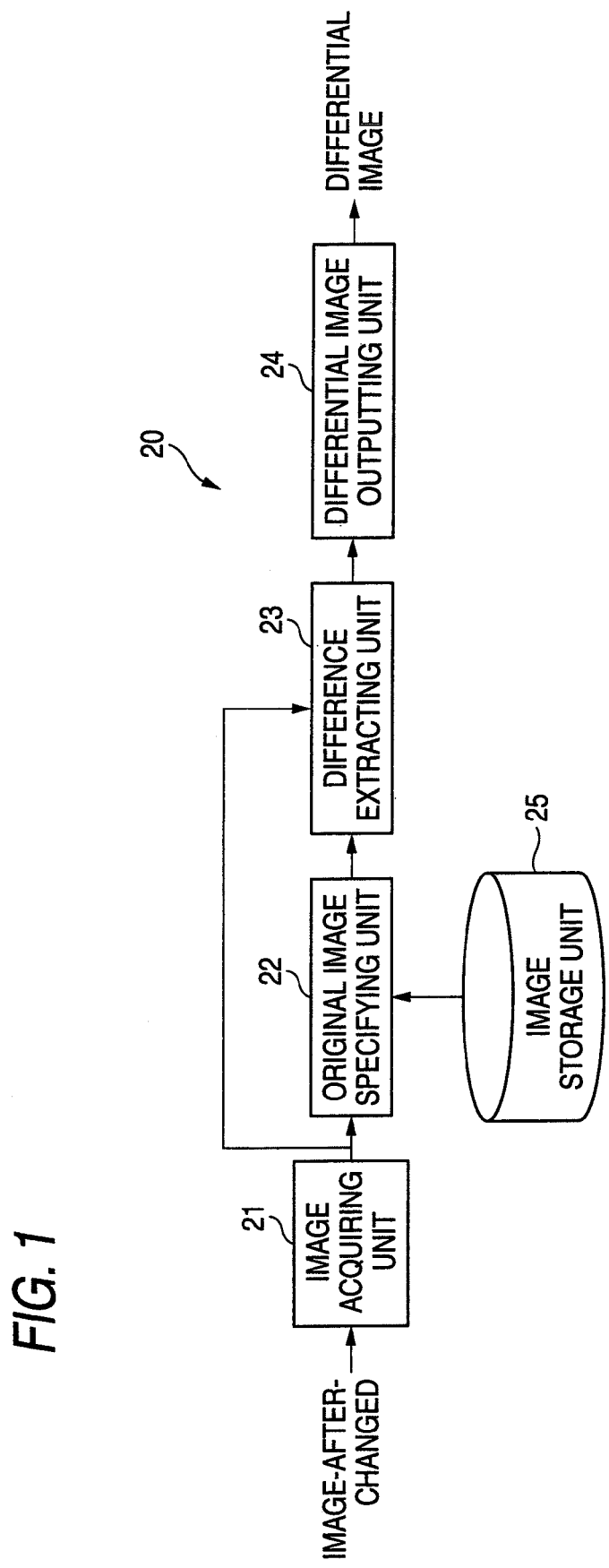
FIG. 1 is a block arrangement view showing a basic arrangement of a difference extracting device in Embodiment 1.

Hereinafter, referring to the drawings, an explanation will be given of various embodiments.

Embodiment 1

Figure 2:
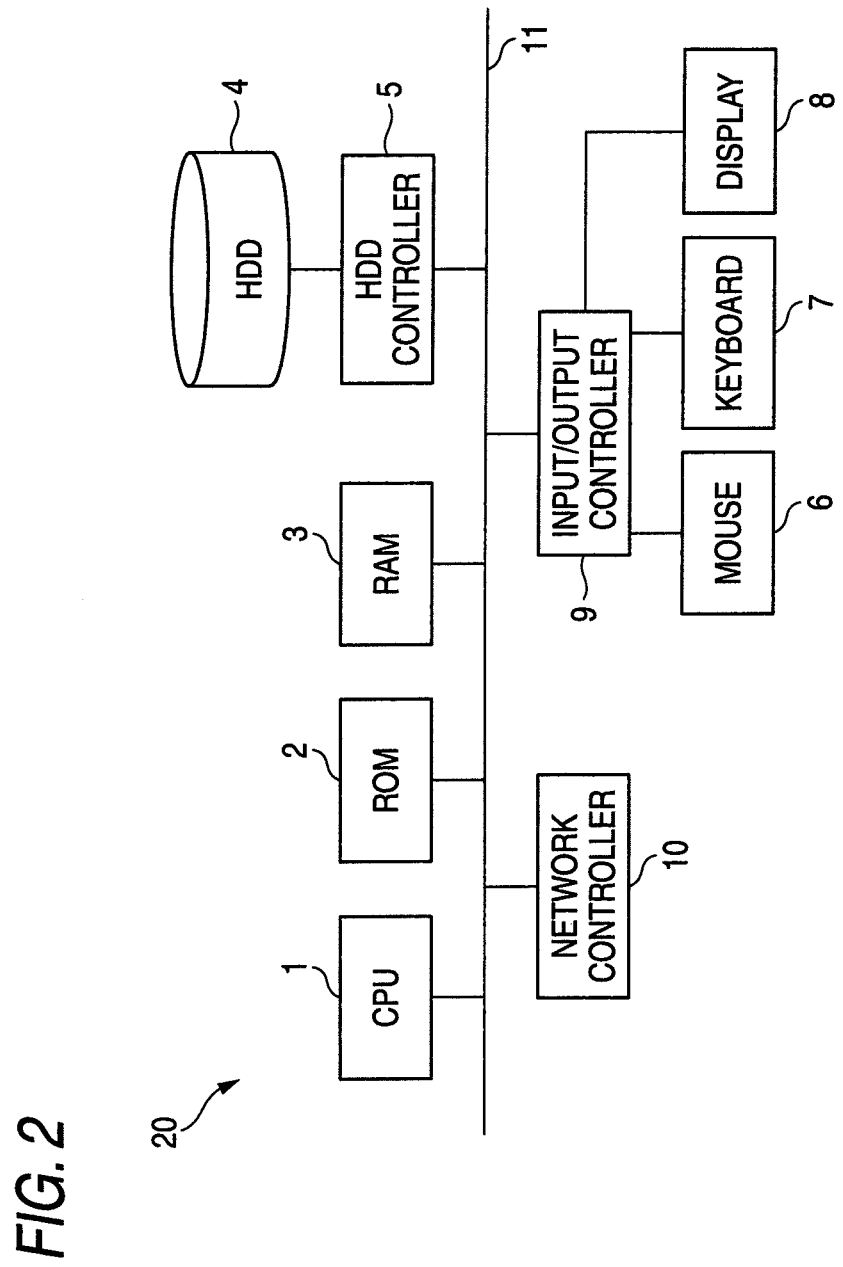
FIG. 2 is a view showing an example of the hardware arrangement of a computer constituting a difference extracting device 20 in Embodiment 1.

FIG. 1 is a block arrangement view showing a basic arrangement of a difference extracting device in this embodiment. FIG. 2 is a view showing an example of the hardware arrangement of a computer constituting a difference extracting device 20 in this embodiment. The computer constituting the difference extracting device 20 according to this embodiment can be realized by a general hardware arrangement existing conventionally. Specifically, as shown in FIG. 2, the computer includes a CPU 1; a ROM 2; a RAM 3; an HDD controller 5 connected to a hard disk drive (HDD) 4; an input/output controller 9 connected to a mouse 6 and a keyboard 7 provided as an inputting means and a display 8 provided as a display device; and a network controller 10 provided as a communicating means. These components are connected to an internal bus 11.

Returning to FIG. 1, the difference extracting device 20 in this embodiment includes an image acquiring unit 21, an original image specifying unit 22, a difference extracting unit 23, a differential image outputting unit 24 and an image storage unit 25. The difference extracting device 20 in this embodiment includes an embodiment of an original image searching device according to this invention; in this embodiment, the image acquiring unit 21 and original image specifying unit 22 constitute the original image searching device. The document (document-after-changed) created with an addition of any change to the document-before-changed) is elecronified e.g. by reading by the scanner. The image acquiring unit 21 acquires this electronified image (image-after-changed). The image storage unit 25 previously store a large quantity of images which may be the original image of the image-after-changed; the original image specifying unit 22 specifies, as a checking region, a discriminating region including an image common to the original image and the image-after-changed, and checks each of images stored in the image storage unit 25 against the image-after-changed in their checking regions thereby to search the image to be the original image of the image-after-changed from the image storage unit 25. Incidentally, the original image, which is image data created by reading a certain document (document-before-changed) using the scanner, may be also referred to as the image-before-changed. The difference extracting unit 23 extracts a differential image between the image-after-changed acquired by the image acquiring unit 21 and the original image of the image-after-changed specified by the original image specifying unit 22. The differential image outputting unit 24 outputs as a data file, the differential image thus extracted into any storage means or a printer not shown.

Figure 3:
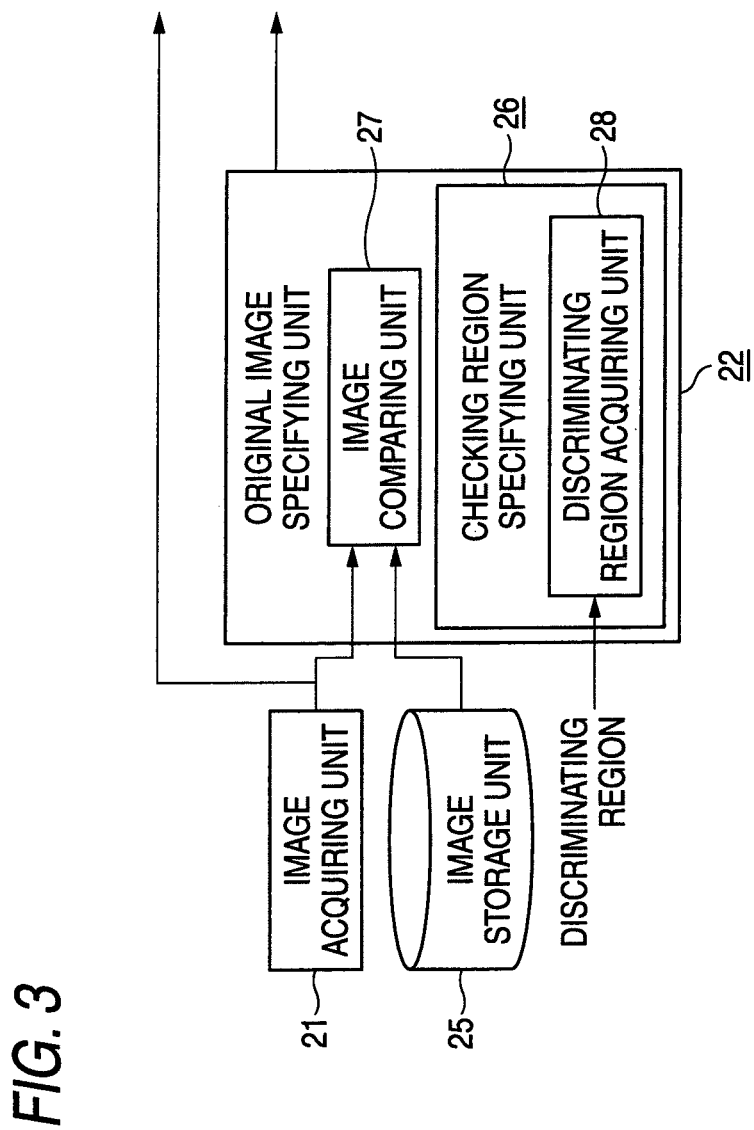
FIG. 3 is a block diagram showing an example of the internal configuration of an original image specifying unit in Embodiment 1.

FIG. 3 is a block arrangement view of a part of the difference extracting device 20 shown in FIG. 1, i.e. a block diagram showing an example of the internal configuration of the original image specifying unit 22 in this embodiment. The original image specifying unit 22 in this embodiment includes a checking region specifying unit 26 and an image comparing unit 27. The checking region specifying unit 26 specifies the checking region. The checking region refers to a region including the image for checking the original image against the image-after-changed, i.e. the region constituting a part of the original image and the image-after-changed. The original image and the image-after-changed are basically the same as each other in their shape and size so that the checking region exists at the same position on each image. A discriminating region acquiring unit 28 included in the checking region specifying unit 26 acquires the discriminating region on the image-after-changed designated by the user. The discriminating region refers to an image region containing the image information peculiar to the original image. By referring to the information within this discriminating region, the pertinent original image can be discriminated from the other original images. Therefore, as described later, with the discriminating region being used as the checking region, if the image is read out from the image storage unit 25 and checked against the image-after-changed and agrees therewith, the image read out can be specified as the original image of the image-after-changed. The image comparing unit 27 compares the image read out from the image storage unit 25 and the image-after-changed in their checking regions.

The respective components 21 to 24 in the difference extracting device 20 are realized by the cooperative operation between the computer constituting the difference extracting device 20 and the program installed in the computer and operated by the CPU 1. The image storage unit 25 is realized by the HDD 4 loaded in the difference extracting device 20.

Further, the programs used in this embodiment can be provided not only from a communicating means but also from a computer-readable recording medium such as CD-ROM or DVD-ROM. The programs provided from the communicating means or the recording medium are installed in the computer; the CPU of the computer successively executes the programs installed thereby to realize various kinds of processing.

Figure 4:
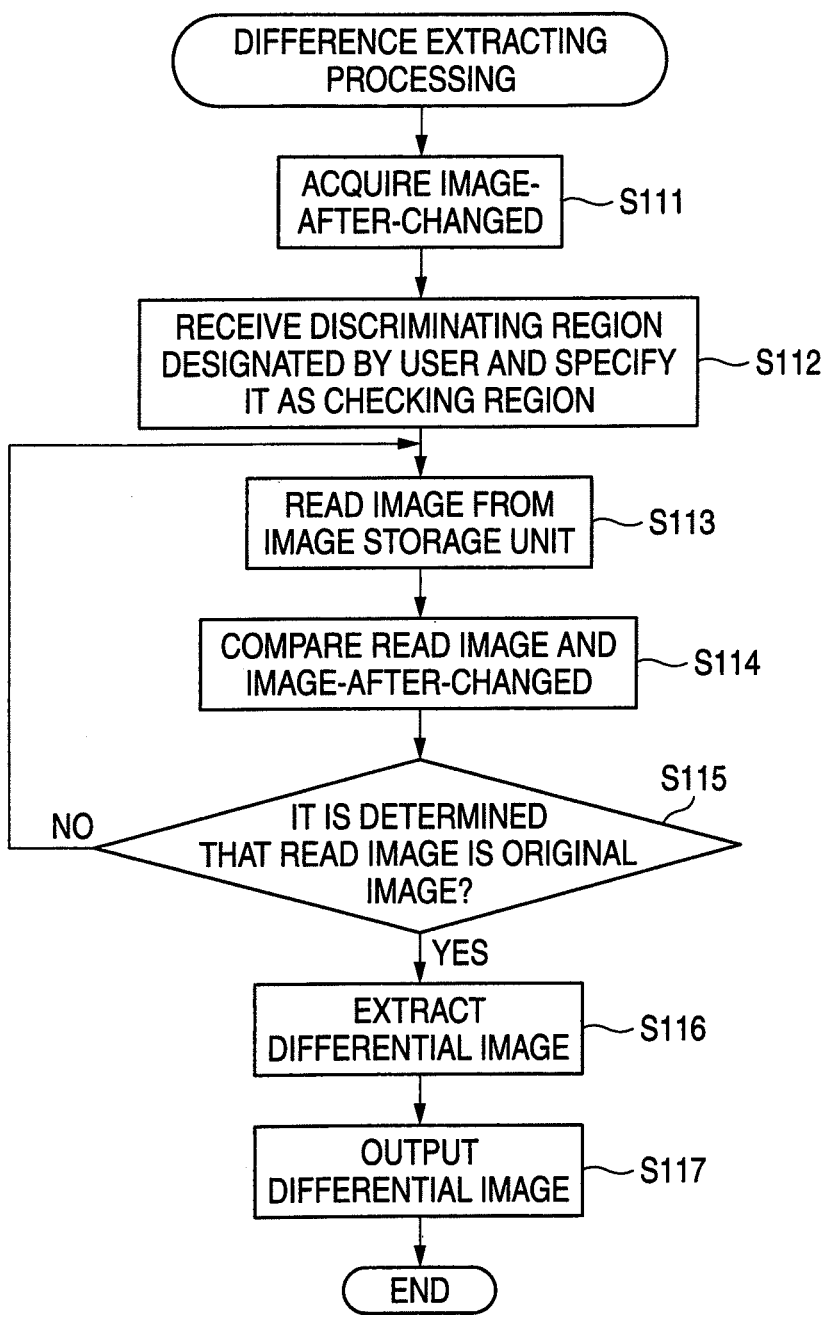
FIG. 4 is a flowchart showing the difference extracting processing in Embodiment 1.

Next, referring to the flowchart of FIG. 4, an explanation will be given of the difference extracting processing of searching the original image of the image-after-changed and extracting/outputting the difference image between the original image and the image-after-changed.

The image acquiring unit 21 acquires an image-after-changed created by reading the document-after-changed with an addition of a change such as writing to a document-before-changed using a document reading means such as a scanner (step 111). The image acquiring unit 21 may acquire, as the image-after-changed, the image read in cooperation with the scanner as it is, or may read, as the image-after-changed, the image data stored in any storage means. The image-after-changed acquired by the image acquiring unit 21 is sent to the original image specifying unit 22 and difference extracting unit 23.

Next, the discriminating region acquiring unit 28 accepts the discriminating region on the image-after-changed designated by the user. More specifically, the image-after-changed sent from the image acquiring unit 21 is displayed on the display 8, and the user designates the region fitting to the discriminating information from the image displayed. The discriminating region acquiring unit 28 accepts the region designated (step 112). In this embodiment, in this way, the user is caused to designate the discriminating region as occasion demands.

For example, where the image-after-changed is a read image of an entry sheet of personal information, the entry column of an individual discriminating number is the discriminating information. Since the pertinent entry sheet can be discriminated from other entry sheets in terms of the individual discriminating number, the pertinent image-after-changed can be discriminated from other images-after-changed in terms of the image of the individual discriminating number. This is also applicable in the original image. The discriminating region may be designated by designating the left upper and right lower square regions with the individual discriminating number entered using the mouse 6; or if an entry column is provided, the closed region including a position pointed by the cursor may be extracted as the discriminating region. In this way, once the discriminating region is accepted, the checking region specifying unit 26 specifies this discriminating region as the checking region on the image-after-changed. The checking region may be specified by the coordinate data on the image.

Subsequently, the image comparing unit 27, from the image storage unit 25, successively reads out the images to be compared with the image-after-changed sent from the image acquiring unit 21 (step 113) and compares the image thus read out and the image-after-changed the image in the images included in their checking regions (step 114). In this embodiment, in this way, not the entire image but only the image included in the checking region specified by the discriminating region is adopted as an object for comparison. Incidentally, in image comparison, the image processing such as aligning of the respective images for comparison or distortion correction may be required. However, such processing, which is not included within the scope of this embodiment, will not be explained here. This also applies to the embodiments described below and other kinds of image comparison. As a result of comparison, if it is determined that the read image is the original image of the image-after-changed (Y in step 115), the original image specifying unit 22 sends the read image to the difference extracting unit 23 as the original image of the image-after-changed.

Now, in this embodiment, where the entire image contained in the checking region of the image read is included in the image-after-changed, it is determined that the image read is the original image of the image-after-changed. Normally, since the checking region contains the image of discriminatable information, they should perfectly agree to each other as a result of comparison. However, in manually adding a change to the document-after-changed, it may be entered to extend into the discriminating region. Further, for example, since the square region designated as the discriminating region is too large, redundant information or dirt on the document may be included. So, in this embodiment, if the entire image included in the checking region is included in the checking region of the image-after-changed, the image thus read out is regarded as the original image of the image-after-changed. Namely, the image read out and the image-after-changed are in an inclusion relationship therebetween.

On the other hand, as a result of comparison between the image read and the image-after-changed, if it determined that the image read is not the original image of the image-after-changed (N in step 115), the image comparing unit 27 reads out, from the image storage unit 25, the image not yet read, and compares the image read with the image-after-changed in the images contained in their checking regions (step 113). Incidentally, in this embodiment, since it is assumed that the original image of the image-after-changed is always registered in the image storage unit 25, by repeating steps 113 to 115, eventually, the processing shifts to step 116.

When the difference extracting unit 23 receives the original image and the image-after-changed thereof from the original image specifying unit 22 and the image acquiring unit 21, respectively, it extracts a differential image between the original image and the image-after-changed in comparison therebetween (step 116). The differential image outputting unit 24, when it receives the differential image supplied from the difference extracting unit 23, outputs the differential image (step 117). The outputting destination may be the display 8, HDD 4, a printer (not shown) through the input/output controller 9 or an external device through the network controller 10.

Embodiment 2

Figure 5:
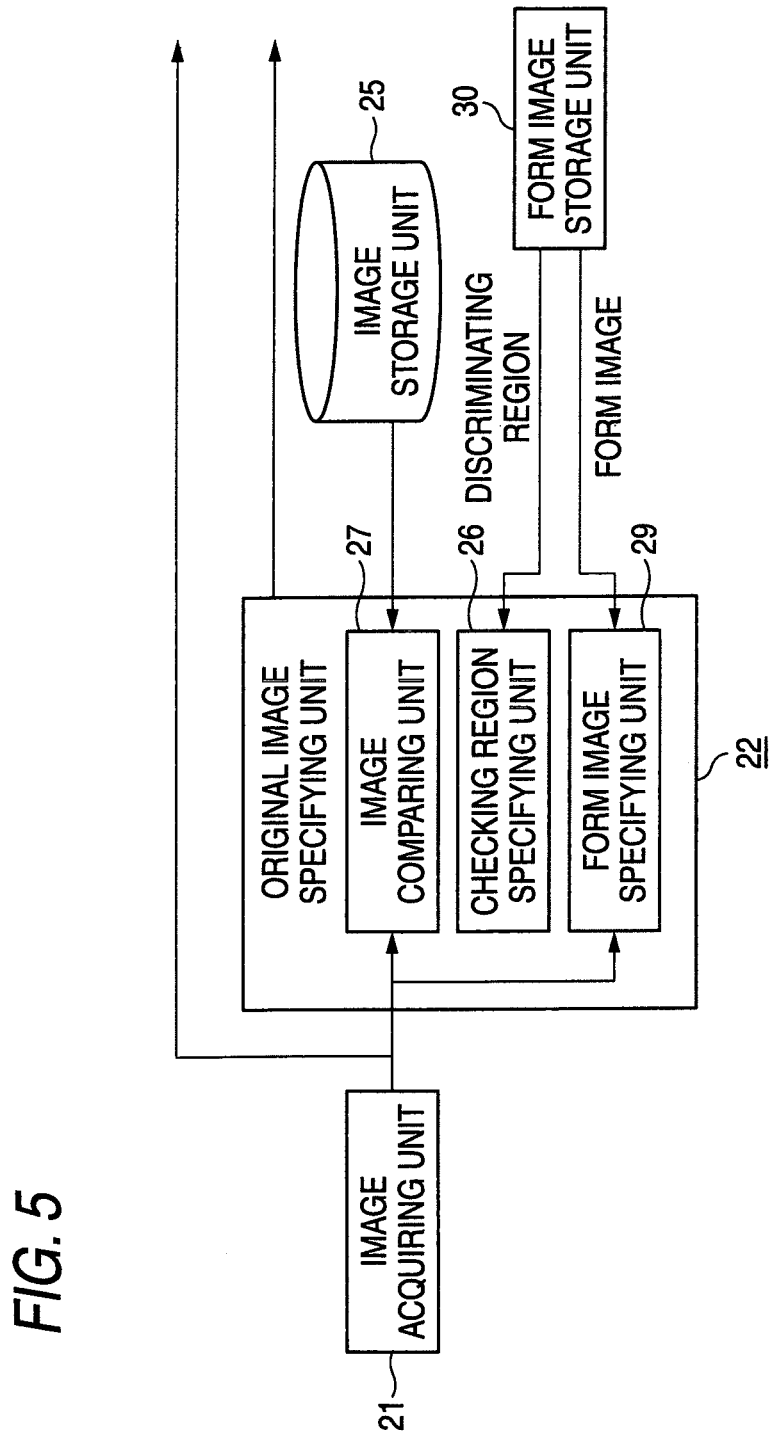
FIG. 5 is a block diagram showing an example of the internal configuration of an original image specifying unit in Embodiment 2.

FIG. 5 is a block arrangement view of a part of the difference extracting device 20 in this embodiment, and mainly shows an example of the internal configuration of the original image specifying unit 22 in this embodiment. The difference extracting device 20 in this embodiment may be the same as Embodiment 1 except for the configuration shown in FIG. 5. In this embodiment, like reference symbols refer to like components in Embodiment 1. This also applies to the embodiments described hereinafter. In FIG. 5, the difference extracting device 20 includes an image acquiring unit 21, an original image specifying unit 22, an image storage unit 25 and a form image storage unit 30. The form image storage unit 30 stores various form images of the document-before-changed and the information for specifying the discriminating region in terms of the form images, which are correlated with each other. According to the example previously described, since the region of the form where the individual discriminating number is to be entered can be known beforehand, the information for specifying the discriminating region in the form image can be previously registered in correlation with the form image in the form image storage unit 30. The image for specifying the discriminating region may be capable of being specified by coordinate data on the image. Incidentally, the form image storage image 30 may be realized by the HDD 4. A form image specifying unit 29 included in the original image specifying unit 22 specifies the form image of the image-after-changed by comparing each of the form images stored in the form image storage unit 30 and the image-after-changed.

Figure 6:
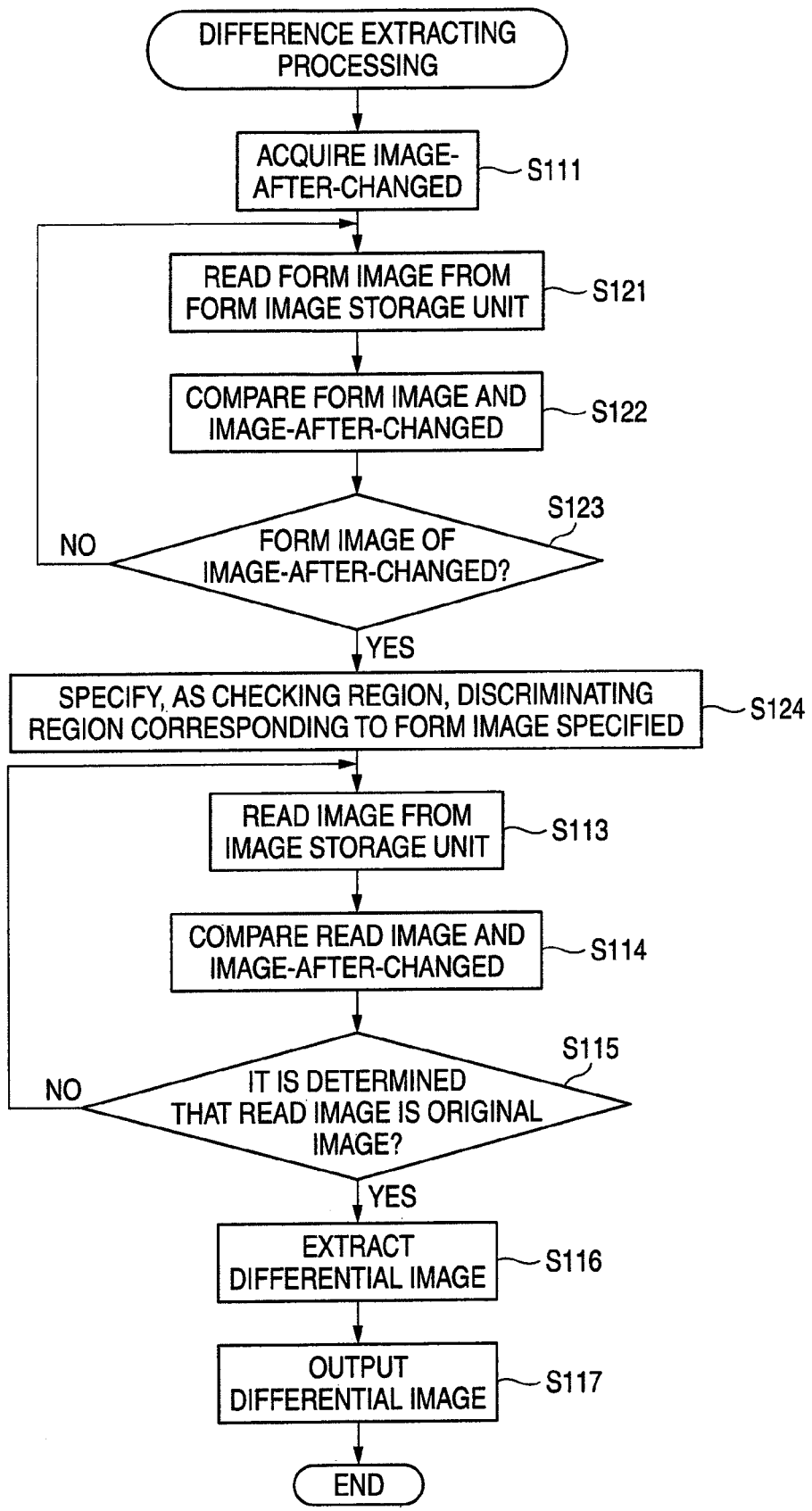
FIG. 6 is a flowchart showing the difference extracting processing in Embodiment 2.

Next, referring to the flowchart of FIG. 6, an explanation will be given of the difference extracting processing in this embodiment. In this flowchart, like reference symbols refer to like processing in Embodiment 1.

Having acquired the image-after-changed sent from the image acquiring unit 21 (step 111), the form image specifying unit 29 reads out the form images one by one from the form image storage unit 30 (step 121), and compares the form image thus read with the image-after-changed (step 122). Now, if it is determined that the form image read is not the form image of the image-after-changed (N in step 123), returning to step 121, the form image specifying unit 29 reads out, from the form image storage unit 30, the form image not yet read. This processing is repeated until the form image of the image-after-changed is searched out. Incidentally, in this embodiment, since it is assumed that the form image of the image-after-changed is always registered in the form image storage unit 30, by repeating steps 121 to 123, eventually, the processing shifts to step 124.

If it is determined that the form image read is the form image of the image-after-changed (Y in step 123), a checking region specifying unit 26 reads out the information for specifying the discriminating region correlated with the pertinent form image from the form image storage unit 30, and specifies, as the checking region, the discriminating region which can be specified by this information (step 124). Incidentally, since the image-after-changed is the read image data of the document-after-changed created as the result that the data such as characters are written on a predetermined form, the image-after-changed should include the entire form image of itself. Therefore, if the entire form image read is included in the image-after-changed, it can be determined that the pertinent form image is the form image of the image-after-changed. In this embodiment, in this way, by previously correlating the discriminating region with the form image and specifying the form image of the image-after-changed, the discriminating region can be specified.

After the checking region has been specified, the image comparing unit 27 successively reads out, from the image storage unit 25, the images to be compared with the image-after-changed sent from the image acquiring unit 21 (step 113), and compares the image thus read with the image-after-changed in the images contained in their checking regions (step 114). After the original image of the image-after-changed has been specified by this comparison processing, the original image is sent to the difference extracting unit 23. The continuing processing, which is the same as in Embodiment 1, will not be explained here.

Embodiment 3

Figure 7:
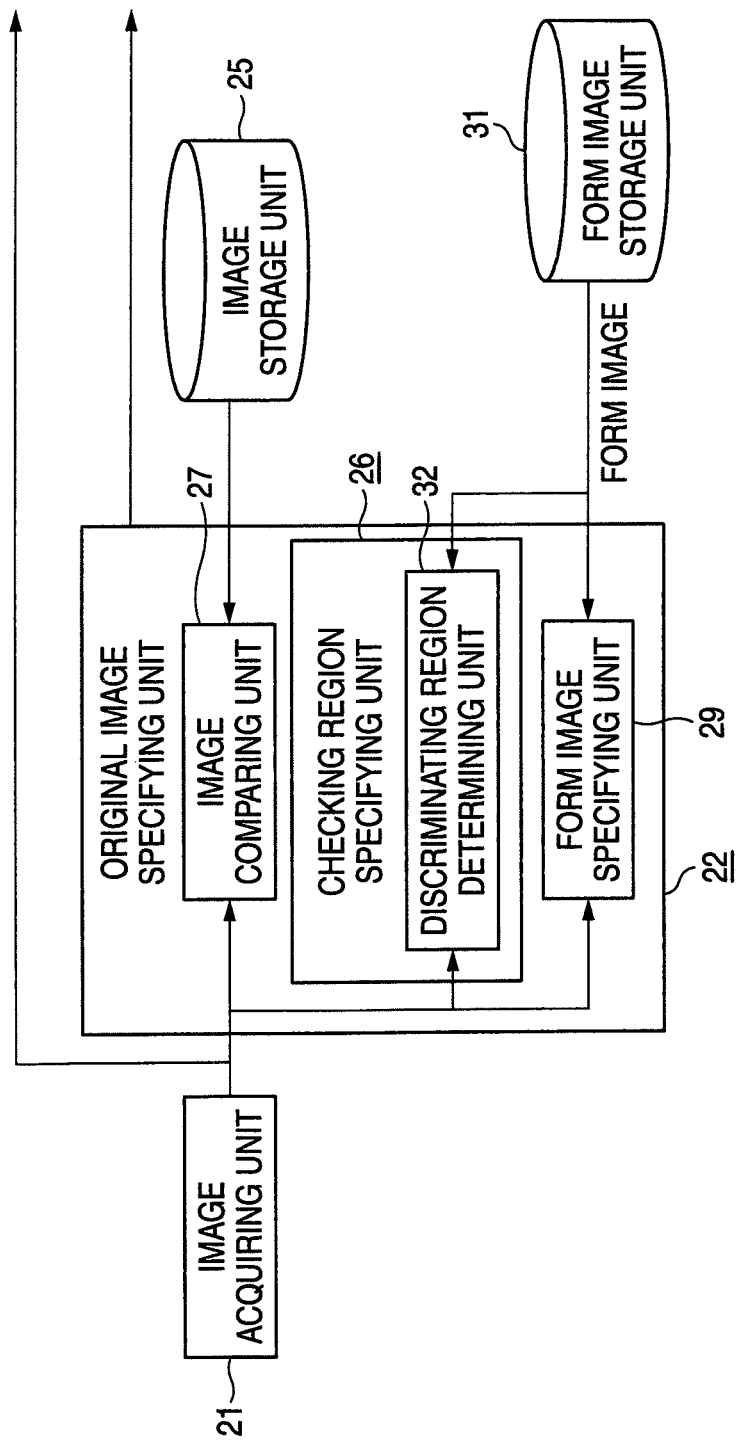
FIG. 7 is a block diagram showing an example of the internal configuration of an original image specifying unit in Embodiment 3.

FIG. 7 is a block arrangement view of a part of the difference extracting device 20 in this embodiment, and mainly shows an example of the internal configuration of the original image specifying unit 22 in this embodiment. The difference extracting device 20 in this embodiment may be the same as Embodiment 1 except for the configuration shown in FIG. 7. In FIG. 7, the difference extracting device 20 includes the image acquiring unit 21, the original image specifying unit 22, the image storage unit 25 and a form image storage unit 31. In this embodiment, the form image storage unit 31 stores various form images of the document-before-changed. Incidentally, the from image storage unit 31 may be realized by the HDD 4. A form image specifying unit 29 included in the original image specifying unit 22 specifies the form image of the image-after-changed by comparing each of the form images stored in the form image storage unit 31 and the image-after-changed. A discriminating region determining unit 32 included in the checking region specifying unit 26 determines the discriminating region in each image before and after changed.

Figure 8:
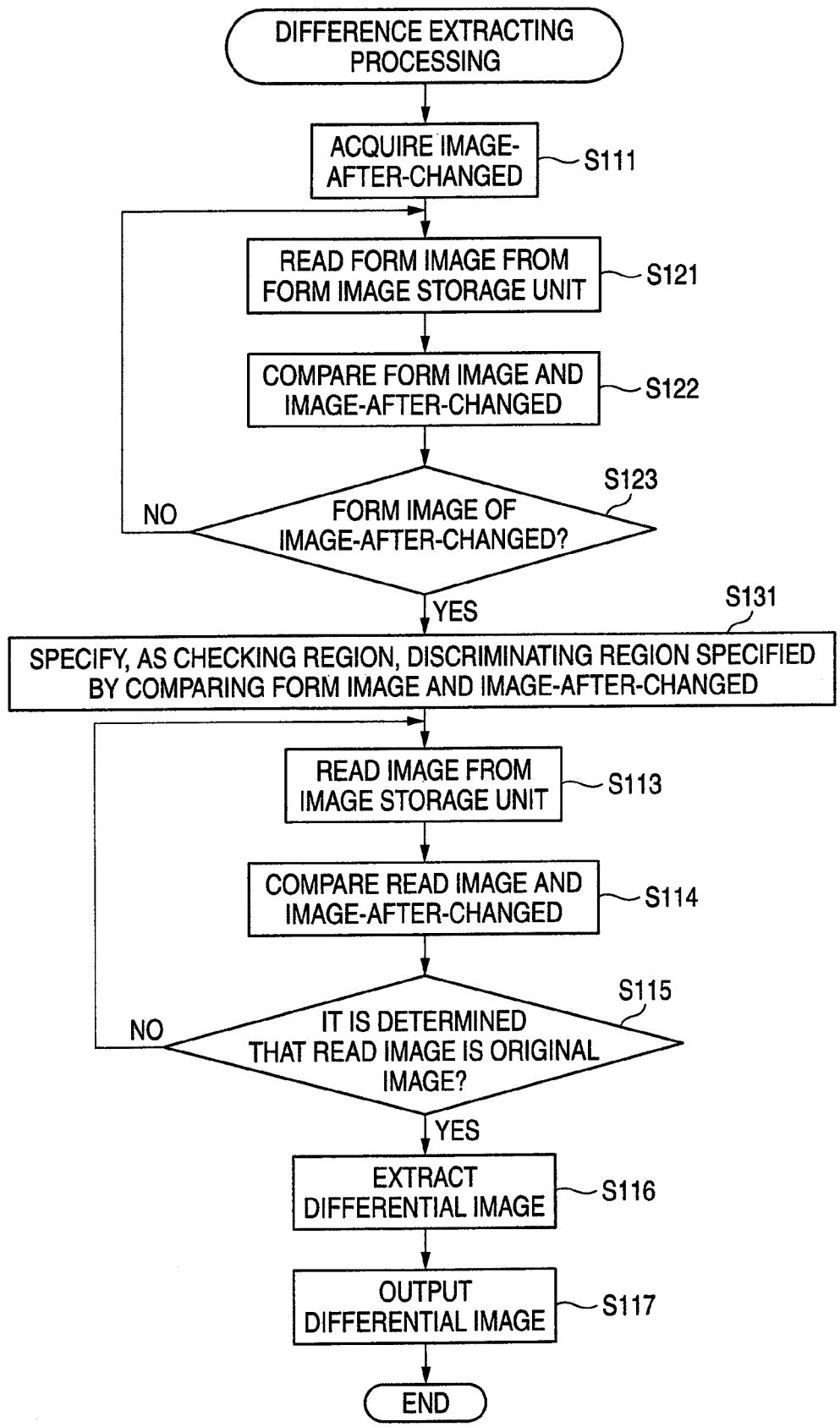
FIG. 8 is a flowchart showing the difference extracting processing in Embodiment 3.

Next, referring to the flowchart of FIG. 8, an explanation will be given of the difference extracting processing in this embodiment. In this flowchart, like reference symbols, which refer to like processing in Embodiments 1 and 2, will not explained appropriately.

Having acquired the image-after-changed sent from the image acquiring unit 21 (step 111), the form image specifying unit 29 specifies the form image of the image-after-changed by comparing the form image stored in the form image storage unit 31 with the image-after-changed (steps 121 to 123).

Subsequently, a discriminating region determining unit 32 extracts the differential image between the specified form image and the image-after-changed and determines, as the discriminating region, the region including the image extracted. The checking region specifying unit 26 specifies, as the checking region, the discriminating region determined by the discriminating region determining unit 32 (step 131). For example, in the case of the form image for entering individual information, the information extracted is the contents entered on the form. The discriminating region of the region including the entered contents is its circumscription. Where there is a square entry column on the form, the closed region constituting the entry column may be extracted as the discriminating region. In this embodiment, by executing the image comparison in this way, the discriminating region is automatically extracted and specified. Incidentally, in this embodiment, as the case may be, plural checking regions are specified.

After the checking region has been specified, the image comparing unit 27 successively reads out, from the image storage unit 25, the images to be compared with the image-after-changed sent from the image acquiring unit 21 (step 113) and compares the image thus read out and the image-after-changed the image in the images contained in their checking regions (step 114).

Now, an attention is paid to the single checking region. The checking region has been specified by extracting the differential image between the form image and the image-after-changed. Further, now, in the contents entered in this checking region, comparison is made between the original image and the image-after-changed. The document-before-changed is created with any write in the form and the document-after-changed is created with any change added thereto. Therefore, in the checking region, the image-before-changed (original image) and the image-after-changed should in the inclusion relationship therebetween. Namely, if the image to be compared is the original image of the image-after-changed, the entire image in the checking region of the original image should be included in the checking region of the image-after-changed. Accordingly, in this embodiment also, as in the embodiments described above, by comparing the checking regions with each other, the original image of the image-after-changed can be searched out.

In this embodiment, there is possibility that there are plural checking regions. In this case, in step 115, in all the image comparisons in the plural checking regions, if it is determined that the image to be compared read out from the image storage unit 25 is the original image of the image-after-changed, the original image specifying unit 22 specifies the image read out as the original image of the image-after-changed. Otherwise, of the plural checking regions, in one or plural checking regions, processing of the image comparison may be done.

The original image of the image-after-changed thus specified is sent to the difference extracting unit 23. The subsequent processing, which is the same as in Embodiment 1, will not be explained here.

Incidentally, the information for specifying the discriminating region extracted in step 131 may be stored for the purpose of reuse.

Embodiment 4

Figure 9:
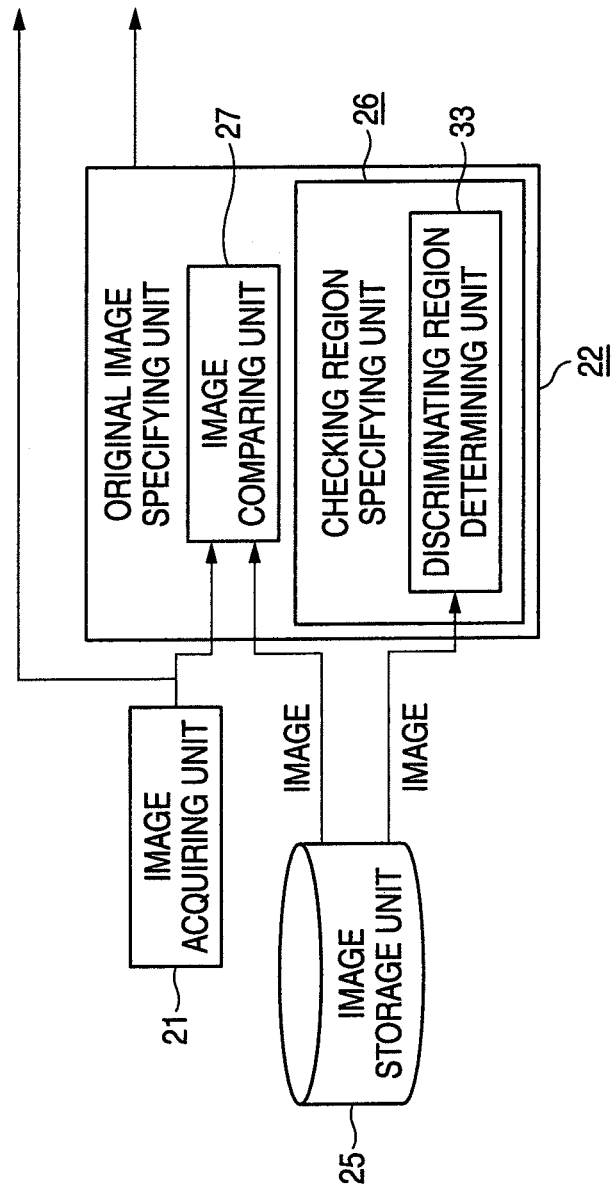
FIG. 9 is a block diagram showing an example of the internal configuration of an original image specifying unit in Embodiment 4.

FIG. 9 is a block arrangement view of a part of the difference extracting device 20 in this embodiment, and mainly shows an example of the internal configuration of the original image specifying unit 22 in this embodiment. The difference extracting device 20 in this embodiment may be the same as Embodiment 1 except for the configuration shown in FIG. 9. In FIG. 9, the difference extracting device 20 includes the image acquiring unit 21, the original image specifying unit 22, the image storage unit 25. In this embodiment, a discriminating region determining unit 33 included in the checking region specifying unit 26 reads out the images from the image storage unit 25 and compares the images read out with one another thereby to determine a discriminating region common to the images stored in the image storage unit 25.

In Embodiments 2 and 3 described above, the information for specifying the discriminating region is registered in its correlation with the form images. This embodiment is applicable to the case of dealing with the image with no form image. It is assumed that the image storage unit 25 stores the same kind of documents-before-changed. Now, the same kind of documents refer to the documents where the region capable of becoming the discriminating region is located at the same region on the document. According to the examples described above, in the same kind of documents, the entry column of the individual discriminating number is given at the same region.

Figure 10:
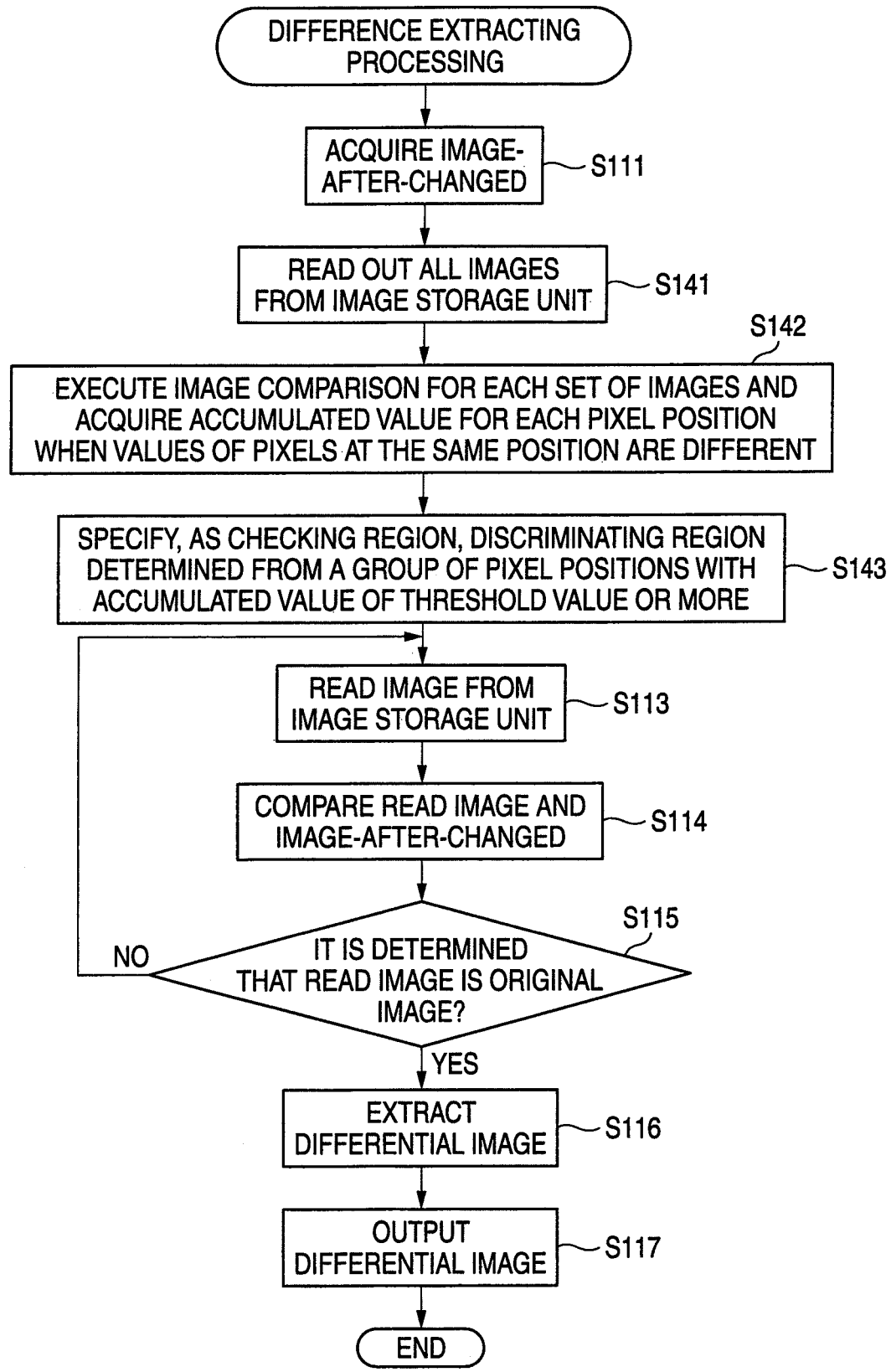
FIG. 10 is a flowchart showing the difference extracting processing in Embodiment 4.

Next, referring to the flowchart of FIG. 10, an explanation will be given of the difference extracting processing in this embodiment. In this flowchart, like reference symbols, which refer to like processing in the embodiments described above, will not explained appropriately.

Having acquired the image-after-changed sent from the image acquiring unit 21 (step 111), the discriminating region determining unit 33 reads out all the images from the image storage unit 25 (step 141). Of the images read out, two images are compared as a single set. The discriminating region determining unit 33 has a counter with an initial value of "0" for each pixel position. As a result of comparison, if the values of the pixels located at the same position are different, "1" is added to the corresponding counter. By executing this processing for combination of all the images read out from the image storage unit 25, accumulated values when the values of the pixels located at the same position are different are acquired. If the number of the images is 10, the processing is executed for 45 sets of images.

In this way, if the comparison for the combination of all the images are completed thereby to acquire the above accumulated values (step 142), the discriminating region determining unit 33 compares a predetermined threshold value and the accumulated value for each pixel, thereby extracting the position of the pixel the accumulated value of the threshold value or more. For the pixel positions giving the accumulated value of the threshold value or more, labeling is done to acquire a circumscribed square. The circumscribed squares overlapping or located in proximity are combined. If the square shape disappears by combining, the pertinent region is shaped into the square shape. The discriminating region determining unit 33 determines, as the discriminating region, the square-shaped region thus obtained. The checking region specifying unit 26 specifies, as the checking region, the discriminating region determined by the discriminating region determining unit 33 (step 143).

Meanwhile, the accumulated values acquired by the above processing are those when the pixel values do not agree with each other. Since the unique contents discriminatable are entered in the discriminating region on the document, in this embodiment, the region containing a group of pixels with larger accumulated values is selected as the discriminating region. In this embodiment, in this way, using the images stored in the image storage unit 25, the discriminating region common to these images will be automatically determined.

Additionally, in this embodiment, in order to determine the discriminating region precisely and automatically, it is desirable that the image storage unit 25 stores only the same kind of documents-before-changed. So, the above description was made assuming that the image storage unit 25 stores only the same kind of documents-before-changed. However, if the same kinds of documents-before-changed classified according to their folder are stored, the discriminating region may be acquired for each folder. Further, in this embodiment, in step 141, all the images are read out from the image storage unit 25 and two images of the images thus read out are selected as a single set. However, in step 142, the accumulated values when the values of the pixels located at the same position are different may be acquired. Therefore, only the images to be compared to each other may be successively read out from the image storage unit 25.

The processing (steps 113 to 117) after the checking region has been specified, which is the same as in Embodiment 1, will not be explained here.

In each of the embodiments described above, explained was a technique of how the discriminating region to be adopted as the checking region of the image is to be determined. Meanwhile, the document which gives an origin of the image to be compared does not necessarily consist of a single page. In this case, the processing described above may be done for a predetermined single page such as a leading page to search the original image and the difference extraction may be done for each of pages. Further, the image acquiring unit 21 may acquire a plurality of documents-after-changed in their unified state. In this case, after the acquired images may be separated in document units, the above processing of searching the original image may be done and the difference extracting processing may be done.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An original image searching device comprising:
   an acquiring unit that acquires an image-after-changed to which a change is added to an original image stored in an image storage, the image-after-changed having contents different from contents of the original image;
   a form image information storage that stores form images each including:
     a discriminating region corresponding to where the change is added, and
     information specifying where each discriminating region is located on each of the form images,
     each of the form images being stored in correlation with each of the information specifying where each discriminating region is located on each of the form images;
   a form image specifying unit that determines whether a form image is a form image of the image-after-changed by first comparing each of the form images stored in the form image information storage with the image-after-changed;
   a checking region specifying unit that:
     reads out from the information specifying where a discrimination region is located on the form image determined by the form image specifying unit, and
     specifies a checking region at a location where the discrimination region is located on the form image determined on at least one image stored in the image storage based on the read out information specifying where the discrimination region is located on the form image determined; and
   an original image specifying unit that determines the original image of the image-after-changed by second comparing the checking region and contents in the checking region of each of the at least one image stored in the image storage and a checking region and the contents of the image-after-changed,
   wherein if an entire portion including the contents of an image included in the checking region of each of the at least one image stored in the image storage is contained in an entire portion including the contents of an image included in the checking region of the image-after-changed, it is determined that a corresponding stored image of the at least one image stored in the image storage is the original image including the contents of the original image of the image-after-changed,
   wherein the at least one image stored in the image storage is stored in a different storage location than the form images.

2. The original image searching device as claimed in claim 1, wherein each of the form images have at least one same predetermined position.

3. The original image searching device as claimed in claim 1, wherein each of predetermined positions of the form images are specified by coordinate data of the form images.

4. The original image searching device as claimed in claim 1, wherein the discriminating region is located on each of the form images at one of predetermined positions of the form images.

5. The original image searching device as claimed in claim 1, wherein the location of the discriminating region on each of the form images is automatically determined without input from a user.

6. The original image searching device as claimed in claim 1, wherein the information read out and the image-after-changed are in an inclusion relationship therebetween.

7. A original image searching method comprising:
   acquiring an image-after-changed to which a change is added to an original image stored in an image storage, the image-after-changed having contents different from contents of the original image;
   storing form images each including:
     a discriminating region corresponding to where the change is added, and
     information specifying where each discriminating region is located on each of the form images,
     each of the form images being stored in correlation with each of the information specifying where each discriminating region is located on each of the form images;
   determining whether a form image is a form image of the image-after-changed by first comparing each of the form images stored in the form image information storage with the image-after-changed;
   reading out from the information specifying where a discrimination region is located on the form image determined;
   specifying a checking region at a location where the discrimination region is located on the form image determined on at least one image stored in the image storage based on the read out information specifying where the discrimination is located on the form image determined; and
   determining the original image of the image-after-changed by second comparing the checking region and contents in the checking region of each of the at least one image stored in the image storage and a checking region and the contents of the image-after-changed, wherein if an entire portion including the contents of an image included in the checking region of each of the at least one image stored in the image storage is contained in an entire portion including the contents of an image included in the checking region of the image-after-changed, it is determined that a corresponding stored image of the at least one image stored in the image storage is the original image including the contents of the original image of the image-after-changed, wherein the at least one image stored in the image storage is stored in a different storage location than the form images.

8. The original image searching method as claimed in claim 7, wherein the correlated form images read out and the image-after-changed are in an inclusion relationship therebetween.

9. A non-transitory computer readable medium storing a program causing a computer to execute a process for searching an original image, the process comprising:

acquiring an image-after-changed to which a change is added to an original image stored in an image storage, the image-after-changed having contents different from contents of the original image;

storing form images each including:
    a discrimination region corresponding to where the change is added, and
    information specifying where each discriminating region is located on each of the form images,
    each of the form images being stored in correlation with each of the information specifying where each discriminating region is located on each of the form images;

determining whether a form image is a form image of the image-after-changed by first comparing each of the form images stored in the form image information storage with the image-after-changed;

reading out from the information specifying where a discrimination region is located on the form image determined;

specifying a checking region at a location where the discrimination region is located on the form image determined on at least one image stored in the image storage based on the read out information specifying where the discrimination region is located on the form image determined; and determining the original image of the image-after-changed by second comparing the checking region and contents in the checking region of each of the at least one image stored in the image storage and a checking region and the contents of the image-after-changed, wherein if an entire portion including the contents of an image included in the checking region of each of the at least one image stored in the image storage is contained in an entire portion including the contents of an image included in the checking region of the image-after-changed, it is determined that a corresponding stored image of the at least one image stored in the image storage is the original image including the contents of the original image of the image-after-changed, wherein the at least one image stored in the image storage is stored in a different storage location than the form images.

10. The process for searching an original image as claimed in claim 9, wherein the correlated form images read out and the image-after-changed are in an inclusion relationship therebetween.

* * * * *